(12) United States Patent
Lust et al.

(10) Patent No.: US 11,870,303 B2
(45) Date of Patent: Jan. 9, 2024

(54) MODULAR SEGMENTED STATOR PACKAGE WITH COUPLING WEB WITH FREE-FITTING PIN

(71) Applicant: ebm-papst Mulfingen GmbH & Co. KG, Mulfingen (DE)

(72) Inventors: Alexander Lust, Obersulm (DE); Ralf Weinmann, Gerabronn-Amlishagen (DE); Matthias Maschke, Kupferzell (DE); Erich Pollok, Niederstetten (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 10 days.

(21) Appl. No.: 17/693,734

(22) Filed: Mar. 14, 2022

(65) Prior Publication Data

US 2022/0294281 A1    Sep. 15, 2022

(30) Foreign Application Priority Data

Mar. 15, 2021    (DE) .................... 10 2021 106 186.5

(51) Int. Cl.
*H02K 1/14*    (2006.01)
*H02K 1/16*    (2006.01)

(52) U.S. Cl.
CPC ............. *H02K 1/148* (2013.01); *H02K 1/165* (2013.01); *H02K 2213/12* (2013.01)

(58) Field of Classification Search
CPC ........... H02K 1/148; H02K 1/12; H02K 1/14; H02K 1/141; H02K 1/143; H02K 1/145;
(Continued)

(56) References Cited

U.S. PATENT DOCUMENTS

| | | | | |
|---|---|---|---|---|
| 2,251,674 A | * | 8/1941 | Gillen | H02K 17/10 310/216.049 |
| 2,502,185 A | * | 3/1950 | Thomas | H02K 1/185 310/216.049 |

(Continued)

FOREIGN PATENT DOCUMENTS

| | | |
|---|---|---|
| DE | 102017201178 A1 | 7/2018 |
| EP | 2672610 A1 | 12/2013 |

(Continued)

OTHER PUBLICATIONS

Search report from corresponding German App No. 102021106186.5 dated Mar. 8, 2022.

*Primary Examiner* — Maged M Almawri
(74) *Attorney, Agent, or Firm* — Harness, Dickey & Pierce, P.L.C.

(57) ABSTRACT

A segmented stator has a plurality of individual teeth (12) connected to one another in the direction of rotation. Each individual tooth (12) has a connecting portion (17) to produce a nonpositive mechanical connection with at least one directly adjacent individual tooth (12). The respective connecting portion (17) has a groove-shaped fastening contour (18, 18*a*, 19, 19*a*), at least on one connecting side (17*a*, 17*b*), facing toward the directly adjacent individual tooth (12). The fastening contour (18, 18*a*, 19, 19*a*) of an adjacent individual tooth (12) can be connected to its connecting portion (17), such that a nonpositive connection is produced which ensures a magnetic flux.

10 Claims, 3 Drawing Sheets

(58) Field of Classification Search
CPC .......... H02K 1/146; H02K 1/16; H02K 1/18;
H02K 1/182; H02K 1/185; H02K 1/187;
H02K 1/06; H02K 15/022; H02K 3/522
USPC .................. 310/216.009, 216.001, 216.113,
310/216.125–216.129, 216.131–216.137,
310/216.021, 216.022, 216.024–216.29,
310/216.086, 216.099
See application file for complete search history.

(56) References Cited

U.S. PATENT DOCUMENTS

| | | | | |
|---|---|---|---|---|
| 2,977,491 A * | 3/1961 | Hueffed | H02K 1/185 | 310/414 |
| 4,574,713 A * | 3/1986 | Kohnen | F27D 1/12 | 52/504 |
| 5,786,651 A * | 7/1998 | Suzuki | H02K 15/022 | 310/216.009 |
| 5,859,486 A * | 1/1999 | Nakahara | H02K 1/148 | 310/216.084 |
| 5,986,377 A * | 11/1999 | Yamada | H02K 15/06 | 310/216.013 |
| 6,044,737 A * | 4/2000 | Yao | H02K 1/146 | 83/13 |
| 6,121,711 A * | 9/2000 | Nakahara | H02K 3/522 | 310/216.096 |
| 6,225,722 B1 * | 5/2001 | Rupp | H02K 21/22 | 310/91 |
| 6,226,856 B1 * | 5/2001 | Kazama | H02K 15/02 | 29/609 |
| 6,265,804 B1 * | 7/2001 | Nitta | H02K 1/148 | 310/43 |
| 6,452,303 B1 * | 9/2002 | Marioni | H02K 1/148 | 310/254.1 |
| 6,504,284 B1 * | 1/2003 | Kazama | H02K 15/02 | 310/216.109 |
| 6,741,005 B2 * | 5/2004 | Vohlgemuth | H02K 1/16 | 29/596 |
| 6,952,069 B2 * | 10/2005 | Akatsu | H02K 1/148 | 310/254.1 |
| 7,067,952 B2 * | 6/2006 | Neal | H02K 1/148 | |
| 7,116,023 B2 * | 10/2006 | Wang | H02K 1/148 | 310/194 |
| 7,120,985 B2 * | 10/2006 | Nouzumi | H02K 1/148 | 29/598 |
| 7,414,347 B2 * | 8/2008 | Wang | H02K 3/522 | 310/260 |
| 7,569,958 B2 * | 8/2009 | Matsuzaki | H02K 21/24 | 310/43 |
| 7,576,467 B2 * | 8/2009 | Yamamoto | H02K 1/148 | 310/216.135 |
| 7,578,047 B2 * | 8/2009 | Wang | H02K 3/522 | 29/33 F |
| 7,615,907 B2 * | 11/2009 | Fei | H02K 1/148 | 310/216.114 |
| 7,777,387 B2 * | 8/2010 | Nagai | H02K 15/026 | 310/216.013 |
| 7,847,444 B2 * | 12/2010 | Kingman | H02K 5/203 | 310/91 |
| 7,960,889 B2 * | 6/2011 | Yamamoto | H02K 1/148 | 310/216.057 |
| 7,965,014 B2 * | 6/2011 | Shinagawa | H02K 1/148 | 310/216.113 |
| 7,982,356 B2 * | 7/2011 | Buban | H02K 1/148 | 310/216.118 |
| 7,986,064 B2 * | 7/2011 | Katagiri | H02K 1/185 | 310/43 |
| 8,018,115 B2 * | 9/2011 | Lyle | H02K 3/522 | 310/216.009 |
| 8,400,041 B2 * | 3/2013 | Modi | H02K 3/522 | 310/194 |
| 8,413,318 B2 * | 4/2013 | Ikeda | H02K 15/022 | 336/200 |
| 8,456,055 B2 * | 6/2013 | Kinoshita | H02K 1/24 | 310/216.008 |
| 8,466,596 B2 * | 6/2013 | Maki | H02K 1/148 | 310/216.043 |
| 8,492,948 B2 * | 7/2013 | Wang | H02K 3/522 | 310/194 |
| 8,575,815 B2 * | 11/2013 | Jang | H02K 1/148 | 310/216.001 |
| 8,677,608 B2 * | 3/2014 | Akita | H02K 1/148 | 336/200 |
| 8,689,427 B2 * | 4/2014 | Bourqui | H02K 1/185 | 310/216.074 |
| 8,704,422 B2 * | 4/2014 | Jurkowski | H02K 1/146 | 310/216.074 |
| 8,736,129 B2 * | 5/2014 | Wang | H02K 3/522 | 310/194 |
| 8,884,490 B2 * | 11/2014 | Meier | H02K 1/148 | 29/598 |
| 8,941,274 B2 * | 1/2015 | Gianni | H02K 1/148 | 310/216.013 |
| 8,970,086 B2 * | 3/2015 | Jo | H02K 15/022 | 310/216.135 |
| 9,000,650 B2 * | 4/2015 | Bach Andersen | H02K 1/148 | 310/216.007 |
| 9,306,421 B2 * | 4/2016 | Lee | B22F 5/106 | |
| 9,502,940 B2 * | 11/2016 | Yoshida | H02K 3/48 | |
| 9,601,950 B2 * | 3/2017 | Yamamura | H02K 29/03 | |
| 9,634,533 B2 * | 4/2017 | Uchitani | H02K 3/522 | |
| 9,755,488 B2 * | 9/2017 | Yu | H02K 1/148 | |
| 9,780,607 B2 * | 10/2017 | Weiske | H02K 1/146 | |
| 9,960,644 B2 * | 5/2018 | Hashimoto | H02K 1/148 | |
| 10,128,700 B2 * | 11/2018 | Umeda | H02K 1/148 | |
| 10,135,316 B2 * | 11/2018 | Carrasco | H02K 7/09 | |
| 10,224,767 B2 * | 3/2019 | Michaelides | H02K 41/03 | |
| 10,291,084 B2 * | 5/2019 | Utsumi | H02K 15/022 | |
| 10,348,163 B2 * | 7/2019 | Lin | H02K 1/148 | |
| 10,411,531 B2 * | 9/2019 | Carrasco | H02K 7/09 | |
| 10,491,057 B2 * | 11/2019 | Seki | H02K 15/022 | |
| 10,673,289 B2 * | 6/2020 | Nakagawa | D06F 37/304 | |
| 10,833,542 B2 * | 11/2020 | Ge | H02K 1/148 | |
| 11,165,312 B2 * | 11/2021 | Tokoi | H02K 1/20 | |
| 11,588,386 B2 * | 2/2023 | Tsuchida | H02K 1/148 | |
| 2002/0067086 A1 * | 6/2002 | Kikuchi | H02K 1/185 | 310/54 |
| 2002/0093269 A1 * | 7/2002 | Harter | H02K 1/148 | 310/254.1 |
| 2003/0057797 A1 * | 3/2003 | Kaneko | H02K 5/128 | 310/216.064 |
| 2004/0051417 A1 * | 3/2004 | Yamazaki | H02K 1/148 | 310/216.009 |
| 2004/0084988 A1 * | 5/2004 | Sheeran | H02K 15/095 | 29/596 |
| 2004/0104638 A1 * | 6/2004 | Yoneda | H02K 1/148 | 310/216.012 |
| 2004/0124733 A1 * | 7/2004 | Yamamoto | H02K 3/522 | 29/596 |
| 2004/0164641 A1 * | 8/2004 | Yamada | H02K 3/524 | 310/194 |
| 2004/0189137 A1 * | 9/2004 | Hashimoto | H02K 1/148 | 310/402 |
| 2004/0217669 A1 * | 11/2004 | Fujii | H02K 1/148 | 310/216.045 |
| 2004/0256919 A1 * | 12/2004 | Hashimoto | H02K 41/03 | 310/12.25 |
| 2005/0017596 A1 * | 1/2005 | Naito | H02K 1/148 | 310/156.32 |
| 2005/0057113 A1 * | 3/2005 | Du | H02K 3/522 | 310/216.091 |
| 2005/0067912 A1 * | 3/2005 | Murakami | H02K 1/148 | 310/216.043 |
| 2005/0073213 A1 * | 4/2005 | Naito | H02K 1/148 | 310/156.32 |
| 2005/0125988 A1 * | 6/2005 | Fukatsu | H02K 15/06 | 29/596 |
| 2005/0212378 A1 * | 9/2005 | Wang | H02K 1/148 | 310/260 |

(56) References Cited

U.S. PATENT DOCUMENTS

| | | | |
|---|---|---|---|
| 2006/0103263 A1* | 5/2006 | Naito | B60L 50/51 310/156.32 |
| 2007/0018528 A1* | 1/2007 | Naitou | H02K 1/148 310/43 |
| 2007/0096587 A1* | 5/2007 | Ionel | H02K 1/148 310/180 |
| 2007/0114875 A1* | 5/2007 | Lyle | H02K 3/522 310/216.004 |
| 2007/0196615 A1* | 8/2007 | Bach Andersen | H02K 1/148 428/57 |
| 2008/0106161 A1* | 5/2008 | Matsuzaki | H02K 3/524 310/194 |
| 2008/0136285 A1* | 6/2008 | Tajima | G11B 17/038 310/216.057 |
| 2009/0026851 A1* | 1/2009 | Liou | H02K 1/148 29/598 |
| 2009/0072647 A1* | 3/2009 | Hino | H02K 1/276 903/906 |
| 2009/0121577 A1* | 5/2009 | Tatematsu | H02K 1/148 310/216.135 |
| 2009/0284096 A1* | 11/2009 | Katagiri | H02K 1/148 310/257 |
| 2010/0001611 A1* | 1/2010 | Utaka | H02K 1/16 310/216.009 |
| 2010/0135830 A1* | 6/2010 | Yasuda | H02K 1/146 310/216.069 |
| 2010/0213785 A1* | 8/2010 | Nagai | H02K 1/148 310/216.043 |
| 2010/0225179 A1* | 9/2010 | Wang | H02K 41/031 310/12.26 |
| 2011/0101816 A1* | 5/2011 | Kondou | H02K 1/16 310/216.069 |
| 2011/0115314 A1* | 5/2011 | Du | H02K 1/148 310/50 |
| 2011/0115317 A1* | 5/2011 | Stark | H02K 1/148 310/71 |
| 2011/0169368 A1* | 7/2011 | Tsumagari | H02K 1/12 310/216.009 |
| 2011/0210640 A1* | 9/2011 | Elser | H02K 3/30 310/208 |
| 2011/0221297 A1* | 9/2011 | Langford | H02K 3/345 310/215 |
| 2012/0272512 A1* | 11/2012 | Uchiumi | H02K 15/0081 29/596 |
| 2013/0026878 A1* | 1/2013 | Feuerrohr | A23L 2/52 310/216.136 |
| 2013/0076195 A1* | 3/2013 | Li | H02K 29/03 310/216.097 |
| 2013/0169097 A1* | 7/2013 | Saban | H02K 21/22 310/152 |
| 2013/0328418 A1 | 12/2013 | Ewert et al. | |
| 2014/0167557 A1* | 6/2014 | Kim | H02K 1/165 310/216.099 |
| 2014/0346918 A1* | 11/2014 | Uchitani | H02K 15/022 29/598 |
| 2014/0361657 A1* | 12/2014 | Vohlgemuth | H02K 15/022 29/596 |
| 2015/0180298 A1* | 6/2015 | Horst | H02K 1/185 310/156.08 |
| 2015/0263572 A1* | 9/2015 | Hyppias | H02K 1/2795 310/156.01 |
| 2015/0333577 A1* | 11/2015 | Jang | H02K 1/148 29/596 |
| 2015/0364954 A1* | 12/2015 | Senoo | H02K 1/14 310/216.009 |
| 2016/0043598 A1* | 2/2016 | Chang | H02K 1/14 310/254.1 |
| 2016/0099616 A1* | 4/2016 | Hino | H02K 1/16 310/216.043 |
| 2016/0164351 A1* | 6/2016 | Weiske | H02K 15/095 29/596 |
| 2016/0172921 A1* | 6/2016 | Yoshinori | H02K 3/28 310/215 |
| 2016/0285324 A1* | 9/2016 | Carrasco | H02K 1/185 |
| 2016/0365778 A1* | 12/2016 | Yu | H02K 3/345 |
| 2017/0149295 A1* | 5/2017 | Kawasaki | H02K 1/148 |
| 2018/0212478 A1* | 7/2018 | Nakamura | H02K 15/022 |
| 2019/0393739 A1* | 12/2019 | Seo | H02K 1/148 |
| 2020/0119600 A1* | 4/2020 | Inuzuka | H02K 1/16 |
| 2021/0050757 A1* | 2/2021 | Kitano | H02K 3/325 |

FOREIGN PATENT DOCUMENTS

| | | |
|---|---|---|
| WO | WO-2003073591 A1 | 9/2003 |
| WO | WO-2005114813 A1 | 12/2005 |

* cited by examiner

MODULAR SEGMENTED STATOR PACKAGE WITH COUPLING WEB WITH FREE-FITTING PIN

CROSS-REFERENCE TO RELATED APPLICATION

This application claims the benefit and priority of German Application No. 10 2021 106 186.5, filed Mar. 15, 2021. The entire disclosure of the above application is incorporated herein by reference.

FIELD

The disclosure relates to an electric motor modular (segmented) stator lamination.

BACKGROUND

Segmented stator laminations are already known from the prior art.

EP 2672610 A1 is concerned with segmented stators and describes one of the sub-problems that result from the interconnection of one segment of a stator to another. In particular, movements between two adjacent segments should be prevented to the greatest possible extent. These movements cause vibrations of the components, which lead to fatigue and are disruptive. Therefore, a defined distance between segments is essential for ensuring a balanced movement of the rotor.

One known solution is the connection of the segments of the stator or rotor by a through bolt with a nut. Due to tolerances of the individual segments, the respective segment-to-segment distances between the respective segment pairs can vary. The segment-to-segment distance between two adjacent segments is compensated for through the selection of shims. This method is quite complicated since it requires the operator to stock a full set of shims of different sizes during assembly. This method does not meet the requirements for the professional manufacturing of modern engines.

Therefore, there is a need to provide a segmented stator that enables segments of a stator or a rotor to be connected in an efficient manner. Moreover, a method for attaching segments of a segmented stator may be required where the segments can be assembled and calibrated in a simple and inexpensive manner.

SUMMARY

The disclosure is therefore based on the object of overcoming the aforementioned drawbacks of the prior art and to provide an improved stator concept that can be manufactured at low cost.

This object is achieved by a segmented stator comprising a plurality of individual teeth that can be connected to one another in a direction of rotation. Each individual tooth has a connecting portion to produce a nonpositive mechanical connection with at least one directly adjacent individual tooth. The respective connecting portion forms a groove-shaped fastening contour at least on one connecting side facing toward the directly adjacent individual tooth. The fastening contour enables an adjacent individual tooth to be connected to its connecting portion, so that a nonpositive connection is produced which ensures a magnetic flux.

According to the disclosure, the stator has a modular structure with a plurality of individual teeth to attach stator windings. The individual teeth are attached to one another and/or to a central stator body in the direction of rotation by a respective fastening contour through which a press pin preferably passes, especially preferably a metallic pin.

Due to the modular structure of the stator lamination, the individual teeth and the material consumption of the required electrical sheet material can be minimized. Punching waste can be substantially reduced compared to a one-piece stator. By virtue of an environmentally friendly impregnation of the entire stator, the modular design results in a compact unit that demonstrably meets the requirements with respect to vibration and service life. Individual teeth can be overmolded with plastic for the purpose of insulation and, if necessary, accommodating wires.

According to the disclosure, a segmented stator includes a plurality of individual teeth that can be connected to one another in the direction of rotation. Each of the individual teeth has a connecting portion for this purpose in order to create a mechanical connection with at least one directly adjacent individual tooth. The respective connecting portion, located at least on one connecting side facing toward the directly adjacent individual tooth, forms a groove-shaped fastening contour via which or on which an adjacent individual tooth can be fixed with its connecting portion.

One embodiment is especially advantageous where a slot, extending in the axial direction of the stator, is on at least one connecting side of the individual teeth. A coupling web, corresponding to the cross-sectional shape of the slot, is on an opposing side. It is designed to engage in the respective slot on the directly adjacent individual tooth in order to mechanically couple or fix these two individual teeth together.

It is also advantageous if groove slots, running in the axial direction, are provided within the slot.

In another preferred embodiment of the disclosure, the coupling webs have one or more web ears that extend outward in the axial direction. The web ears are correspondingly shaped and positioned such that they engage in the respective groove slots when the respective coupling web engages in a corresponding slot. It is especially preferred if the coupling web has a substantially hollow cylindrical shape with an internal channel.

Likewise advantageous is a design where the connecting portion has an approximately T-shaped cross section. It is attached to a radially outwardly extending toothed web of an individual tooth and is formed with lateral portions that protrude beyond the toothed web. These portions can be curved in the shape of part of a circle.

In another preferred embodiment of the disclosure, a useful slot is formed in at least one of the lateral portions that protrude beyond the toothed web.

It is also preferred if the coupling web is embodied as a hollow cylinder with a cylinder wall that extends in the axial direction. There is a receiving space (channel) and a gap that divides the cylinder wall in the axial direction. As a result, the cylinder wall can be bent open, particularly bent open elastically.

An assembly can be implemented particularly well where two respective interconnected individual teeth can be connected to one another to form a circumferential joining gap in the vicinity of the fastening contour. This enables the teeth to be easily and conveniently pushed together.

A secure connection is achieved using a press-fit pin. Advantageously, for this purpose, a press-fit pin of two interconnected individual teeth is introduced into the receiving space (channel) so that a press-fit occurs between the expanded coupling web and the corresponding slot where the coupling web is inserted. In order for this to work, the press-fit pin must have a correspondingly formed diameter. In addition, the widening of the coupling webs results in a nonpositive connection that ensures a good magnetic flux.

A fastening contour is preferred that is shaped so that a form-fitting connection of the individual teeth to one another is ensured by a force effect. Thus, the air gap between two teeth can be minimized with contact surfaces of the teeth that are planar or have a corresponding shape.

In an alternative embodiment of the disclosure, a groove (e.g., an L-shaped groove), extending in the axial direction of the stator, is provided on each of the individual teeth on two connecting sides. A commensurately suitably shaped connecting clip is included. The clip is designed to engage on both sides in the respective groove of the two adjacent individual teeth so as to fix the teeth against one another. This mechanically couples these two individual teeth together.

In this embodiment, it is also advantageous if the connecting clip is a U-shaped connecting clip, viewed in cross section, with two legs that extend toward one another at an oblique angle. The U-shaped connecting clip can be inserted with the legs in the axial direction into the grooves of two adjacent individual teeth to form a positive and/or nonpositive connection.

As a matter of principle, all disclosed features can be combined as desired insofar as technically feasible and expedient.

Further areas of applicability will become apparent from the description provided herein. The description and specific examples in this summary are intended for purposes of illustration only and are not intended to limit the scope of the present disclosure.

DRAWINGS

Other advantageous refinements of the disclosure are characterized in the subclaims and/or depicted in greater detail below together with the description of the preferred embodiment of the disclosure with reference to the figures. In the drawing:

DETAILED DESCRIPTION

The disclosure will be explained in greater detail below on the basis of select exemplary embodiments with reference to FIGS. 1 to 3. The same reference symbols in the figures indicate structurally and/or functionally equivalent parts.

Figure 1:
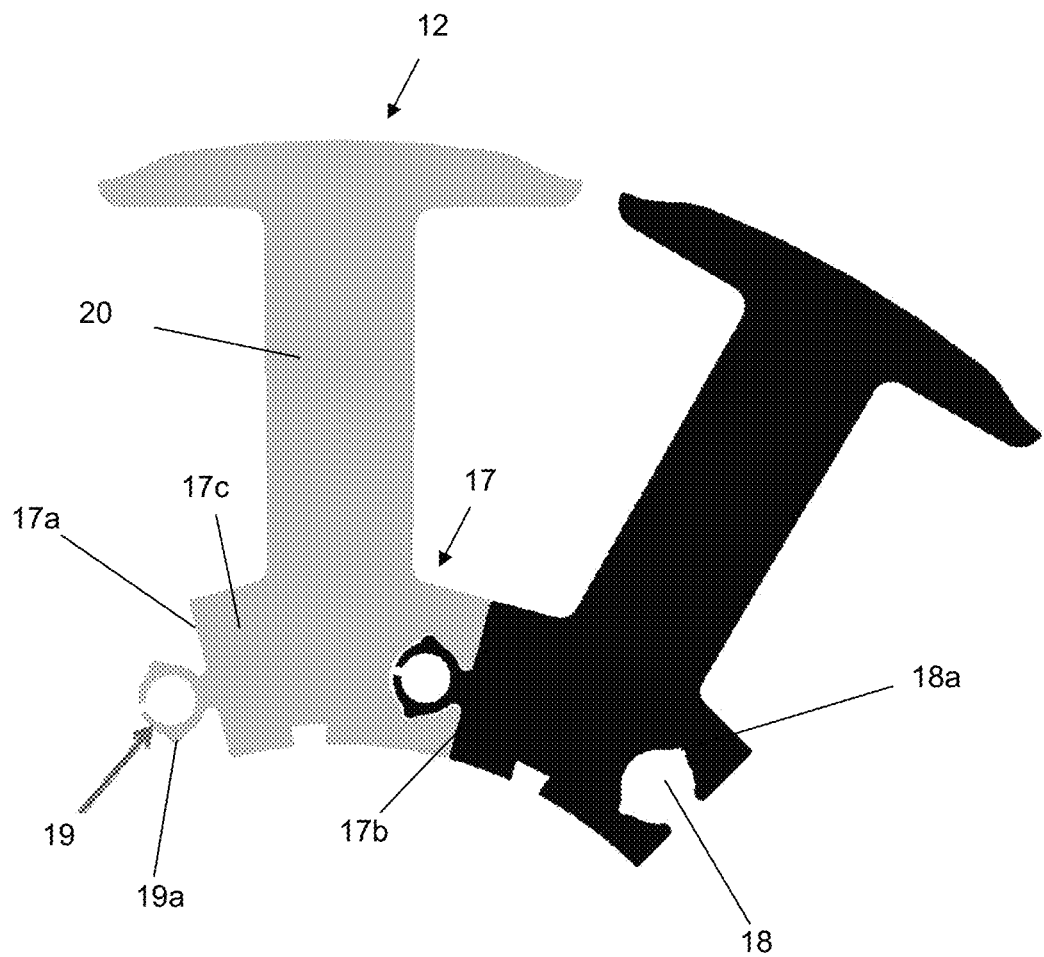
FIG. 1 is a partial section schematic view of a segmented stator with two individual teeth connected to one another.

FIG. 1 shows a first exemplary embodiment, particularly a partial section of a segmented stator including two individual teeth 12 that are connected to one another in a schematic plan view.

The two individual teeth 12 are connected to one another in the direction of rotation. It can be seen that each of the two individual teeth 12 has a connecting portion 17 in order to produce the depicted mechanical connection with the directly adjacent individual tooth 12. The respective connecting portion 17 includes a fastening contour on the connecting side 17a or 17b facing toward the directly adjacent individual tooth 12. The depicted adjacent individual tooth is fixed to its connecting portion.

The individual teeth 12 have, on a connecting side 17a, 17b, a groove 18 that extends in the axial direction of the stator and, on an opposing side, a coupling web 19. The coupling web 19 protrudes in a manner corresponding to the cross-sectional shape of the groove 18 and engages in the groove of the adjacent tooth.

Groove slots 18a, extending in the axial direction, are disposed within the slot 18. Two web ears 19, that extend in the axial direction on the coupling webs 19, protrude commensurately outward and are appropriately designed and positioned such that they engage or protrude into the corresponding groove slots 18a upon engagement of the respective coupling web 19 as shown in FIG. 1.

The connecting portion 17 has an approximately T-shaped cross section with which it is fastened to a tooth web 20, that extends radially outward. Lateral portions 17c protrude beyond the toothed web 20.

Figure 2:
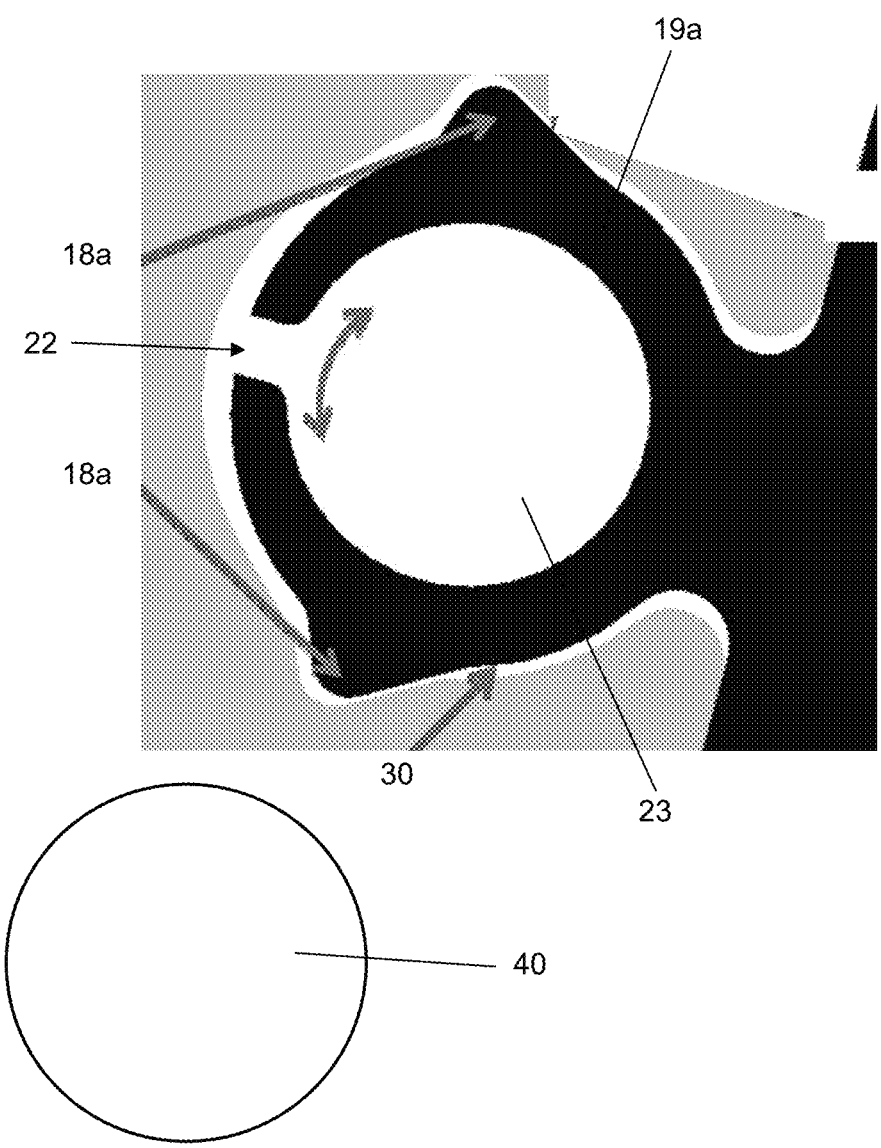
FIG. 2 is a view of a detail from FIG. 1.

As shown in the schematic view of FIG. 2, the coupling web 19 is embodied as a hollow cylinder. A cylinder wall 19a extends in the axial direction. Inside the wall 19a there is a receiving space 23 for a press-fit pin 40. For this purpose, the geometries are matched to one another so that there is a joining gap 30 that exists between the coupling web 19 and the slot 18 as long as the press-fit pin 40 has not been pressed into the channel in the coupling web.

The press-fit pin 40 is indicated only schematically in FIG. 1. If this press-fit pin 40 is introduced into the receiving space 23, a press fit is formed between the coupling web 19 and the corresponding slot 18 into which the coupling web 19 is inserted as the wall 19a is bent open.

Figure 3:
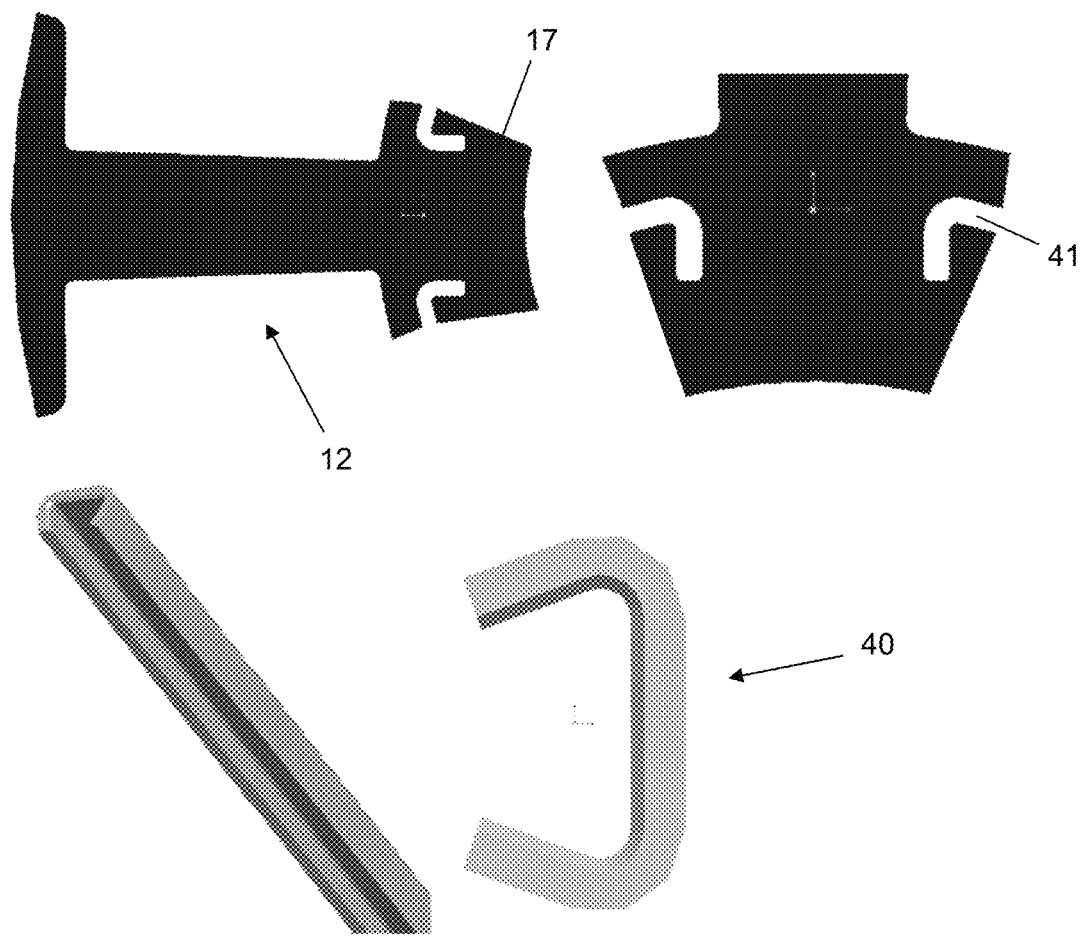
FIG. 3 is a section and perspective view of an alternatively designed individual tooth for a segmented stator together with two views of a connecting clip.

FIG. 3 shows a view of an alternatively configured individual tooth for a segmented stator together with two views of a connecting clamp 41. For this purpose, the individual teeth 12 are each provided on two respective connecting sides 17a, 17b with an L-shaped slot 18. The slot 18 extends, respectively, in the axial direction of the stator. A commensurately shaped connecting clip 40 is designed to engage in the respective slot 18 on both sides in order to fix the adjacent individual teeth 12 together.

The connecting clip 40 is embodied, for instance, as a U-shaped profile with two profile legs 42. The legs 42 extend toward one another at an oblique angle. The legs 42 can be inserted in the axial direction into the slots 18 of two adjacent individual teeth to form a positive and/or nonpositive connection.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A segmented stator comprises:
   a plurality of individual teeth that can be connected to one another in a direction of rotation;
   each individual tooth has a connecting portion to produce a nonpositive mechanical connection with at least one directly adjacent individual tooth;

the respective connecting portion forms a groove-shaped fastening contour at least on one connecting side facing toward the directly adjacent individual tooth;

the fastening contour enables an adjacent individual tooth to be connected to its connecting portion, so that a nonpositive connection is produced which ensures a magnetic flux; and a continuous circumferential joining gap formed between the connecting portion and the groove-shaped fastening contour when the two respective interconnected individual teeth are connected to one another.

2. The segmented stator as set forth in claim 1, wherein the connecting portion has a T-shaped cross section fastened to a radially outwardly extending toothed web and lateral portions protrude beyond the toothed web.

3. The segmented stator as set forth in claim 2, wherein a slot is formed in at least one of the lateral portions protruding beyond the toothed web.

4. The segmented stator as set forth in claim 1, wherein the individual teeth each include two respective connecting sides with an L-shaped slot that extends respectively in the axial direction of the stator and a commensurately shaped connecting clip to engage in the respective slot on both sides in order to fix the adjacent individual teeth against one another, thereby mechanically coupling these two individual teeth together.

5. The segmented stator as set forth in claim 4, wherein the connecting clip is U-shaped with two legs that extend toward one another at an oblique angle, the U-shaped connecting clip inserted, with the legs in the axial direction, into the slots of two adjacent individual teeth to form a positive and/or nonpositive connection.

6. The segmented stator as set forth in claim 1, where a slot, extending in the axial direction of the stator, is on at least one connecting side of the individual teeth, and a coupling web, corresponding to the cross-sectional shape of the slot is on an opposing side, the web engages in the respective slot on the directly adjacent individual tooth in order to mechanically couple or fix these two individual teeth together.

7. The segmented stator as set forth in claim 6, wherein groove slots, extending in the axial direction, are within the slot.

8. The segmented stator as set forth in claim 7, wherein coupling webs include one or more web ears that extend outward in the axial direction and are correspondingly shaped and positioned that they engage in the respective groove slots when the respective coupling web engages in a corresponding slot.

9. The segmented stator as set forth in claim 6, wherein the coupling web is a hollow cylinder with a cylinder wall that extends in the axial direction and a receiving space and a gap dividing the cylinder wall in the axial direction.

10. The segmented stator as set forth in claim 9, wherein a press-fit pin of two interconnected individual teeth is introduced into the receiving space so that a press-fit occurs between the coupling web and the corresponding slot where the coupling web is inserted.

* * * * *